(12) United States Patent
Mihalakis

(10) Patent No.: US 7,530,693 B2
(45) Date of Patent: May 12, 2009

(54) SINGLE MEMS IMAGER OPTICAL ENGINE

(75) Inventor: George M. Mihalakis, San Jose, CA (US)

(73) Assignee: Next Wave Optics Inc., San Jose, CA (US)

( * ) Notice: Subject to any disclaimer, the term of this patent is extended or adjusted under 35 U.S.C. 154(b) by 82 days.

(21) Appl. No.: 11/443,611

(22) Filed: May 30, 2006

(65) Prior Publication Data

US 2006/0274273 A1    Dec. 7, 2006

Related U.S. Application Data

(60) Provisional application No. 60/686,155, filed on May 31, 2005.

(51) Int. Cl.
 *G03B 21/00* (2006.01)
(52) U.S. Cl. .......................................... 353/31; 353/81
(58) Field of Classification Search .................. 353/8, 353/20, 33, 84, 31, 81; 359/30, 290, 291
See application file for complete search history.

(56) References Cited

U.S. PATENT DOCUMENTS

| | | | |
|---|---|---|---|
| 4,739,396 A | 4/1988 | Hyatt | 358/60 |
| 4,796,978 A | 1/1989 | Tanaka et al. | 350/337 |
| 4,864,390 A | 9/1989 | McKechnie et al. | 358/60 |
| 4,935,656 A | 6/1990 | Kawamura | 310/156 |
| 4,962,997 A | 10/1990 | Baldwin | 350/172 |
| 4,983,032 A | 1/1991 | Van Den Brandt | 353/30 |
| 4,989,076 A | 1/1991 | Owada et al. | 358/61 |
| 5,012,274 A | 4/1991 | Dolgoff | 340/702 |
| 5,022,750 A | 6/1991 | Flasck | 353/31 |
| 5,024,524 A | 6/1991 | Flasck | 353/31 |
| 5,028,121 A | 7/1991 | Baur et al. | 350/351 R |
| 5,042,929 A | 8/1991 | Tanaka et al. | 359/708 |
| 5,060,058 A | 10/1991 | Goldenberg et al. | 358/60 |
| 5,075,798 A | 12/1991 | Sonehara et al. | 359/490 |
| 5,097,323 A | 3/1992 | Sato et al. | 358/60 |
| 5,098,183 A | 3/1992 | Sonehara | 353/31 |
| 5,105,265 A | 4/1992 | Sato et al. | 358/60 |
| 5,108,172 A | 4/1992 | Flasck | 353/31 |
| 5,115,305 A | 5/1992 | Bauer et al. | 358/60 |
| 5,181,054 A | 1/1993 | Nicolas et al. | 353/20 |
| 5,231,431 A | 7/1993 | Yano et al. | 353/31 |
| 5,239,322 A | 8/1993 | Takanashi et al. | 353/31 |
| 5,245,449 A | 9/1993 | Ooi et al. | 359/40 |
| 5,321,448 A | 6/1994 | Ogawa | 353/34 |
| 5,327,270 A | 7/1994 | Miyatake | 359/63 |
| 5,386,306 A | 1/1995 | Ginjina et al. | 359/52 |
| 5,390,048 A | 2/1995 | Miyatake et al. | 359/650 |
| 5,400,180 A | 3/1995 | Chung | 359/634 |

(Continued)

FOREIGN PATENT DOCUMENTS

| | | |
|---|---|---|
| EP | 0710 036 A2 | 5/1996 |
| WO | WO 01/50178 | 7/2001 |

*Primary Examiner*—Khiem Nguyen
(74) *Attorney, Agent, or Firm*—Orrick, Herrington & Sutcliffe LLP

(57) ABSTRACT

An optical engine for use with MEMS microdisplay devices is disclosed that comprises a collection stage module, an imaging stage module featuring polarization based imaging prism assemblage, and a polarizing illumination stage module featuring a special light integration tube that removes off-axis overfill loss.

3 Claims, 11 Drawing Sheets

U.S. PATENT DOCUMENTS

| | | | |
|---|---|---|---|
| 5,420,655 A | 5/1995 | Shimizu | 353/33 |
| 5,459,539 A | 10/1995 | Yamamoto | 353/119 |
| 5,467,146 A | 11/1995 | Huang et al. | 348/743 |
| 5,486,881 A | 1/1996 | Hang | 353/34 |
| 5,577,826 A | 11/1996 | Kasama et al. | 353/31 |
| 5,748,376 A | 5/1998 | Lin et al. | 359/629 |
| 5,777,789 A | 7/1998 | Chiu et al. | 359/494 |
| 5,798,819 A | 8/1998 | Hattori et al. | 353/33 |
| 5,815,221 A | 9/1998 | Kojima et al. | 348/751 |
| 5,829,855 A | 11/1998 | Uchiyama | 353/74 |
| 5,835,661 A | 11/1998 | Tai et al. | 385/146 |
| 6,034,818 A | 3/2000 | Sedlmayr | 359/497 |
| 6,046,858 A | 4/2000 | Scott et al. | 359/634 |
| 6,053,615 A | 4/2000 | Peterson et al. | 353/20 |
| 6,082,861 A | 7/2000 | Dove et al. | 353/20 |
| 6,089,719 A | 7/2000 | Lin | 353/33 |
| 6,113,239 A | 9/2000 | Sampsell et al. | 353/31 |
| 6,139,156 A | 10/2000 | Okamori et al. | 353/98 |
| 6,174,060 B1 | 1/2001 | Imaoka et al. | 353/31 |
| 6,176,586 B1 | 1/2001 | Hirose et al. | 353/31 |
| 6,183,090 B1 | 2/2001 | Nakanishi et al. | 353/20 |
| 6,183,091 B1 | 2/2001 | Johnson et al. | 353/20 |
| 6,375,330 B1 | 4/2002 | Mihalakis | 353/31 |
| 6,419,362 B1 | 7/2002 | Ikeda et al. | 353/20 |
| 6,454,416 B2 | 9/2002 | Aoto et al. | 353/31 |
| 6,619,804 B2 | 9/2003 | Davis et al. | 353/98 |
| 6,726,332 B2 | 4/2004 | Cannon et al. | 353/33 |
| 6,961,194 B2 | 11/2005 | Penn | 359/833 |
| 2002/0001135 A1 | 1/2002 | Berman et al. | 359/640 |
| 2002/0089679 A1 | 7/2002 | Yi et al. | 358/1.9 |
| 2002/0176054 A1 | 11/2002 | Mhalakis | 351/31 |
| 2006/0092380 A1* | 5/2006 | Salsman et al. | 353/20 |
| 2007/0030456 A1* | 2/2007 | Duncan et al. | 353/20 |
| 2007/0159680 A1* | 7/2007 | Bausenwein et al. | 359/291 |

* cited by examiner

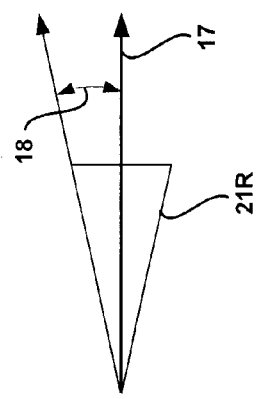
Figure 3
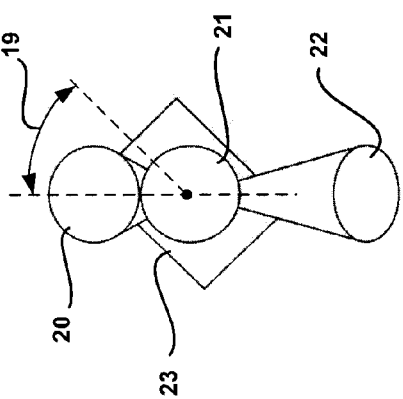
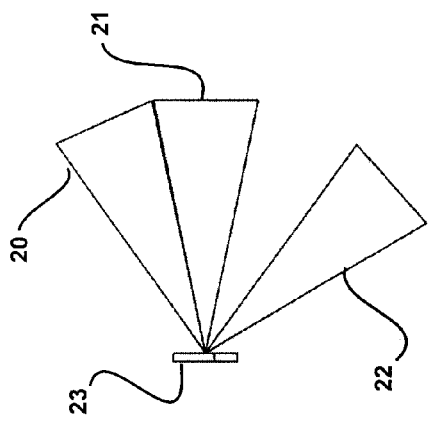
Figure 4
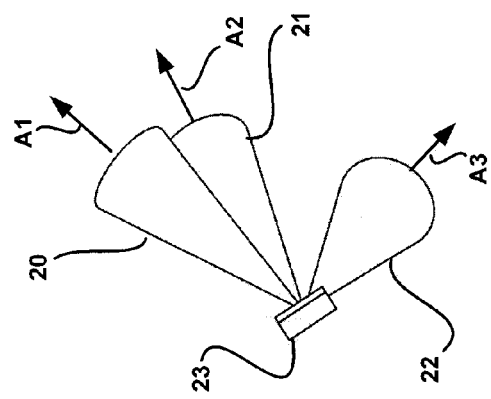
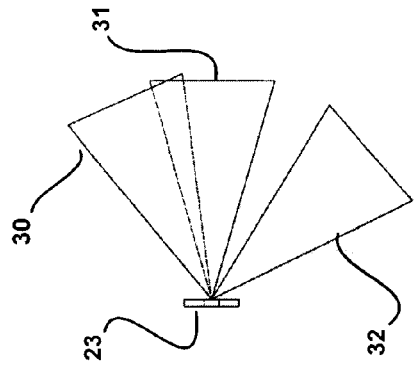
Figure 5
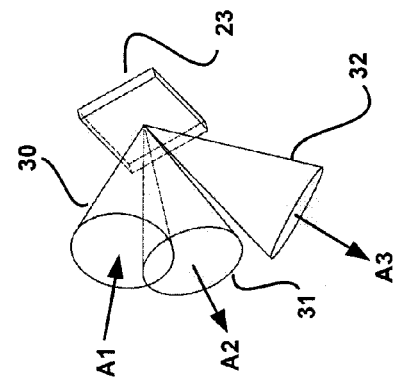

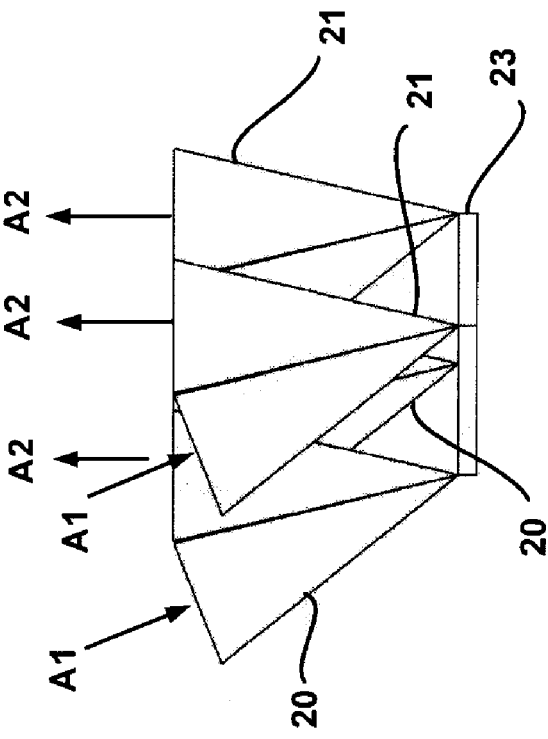
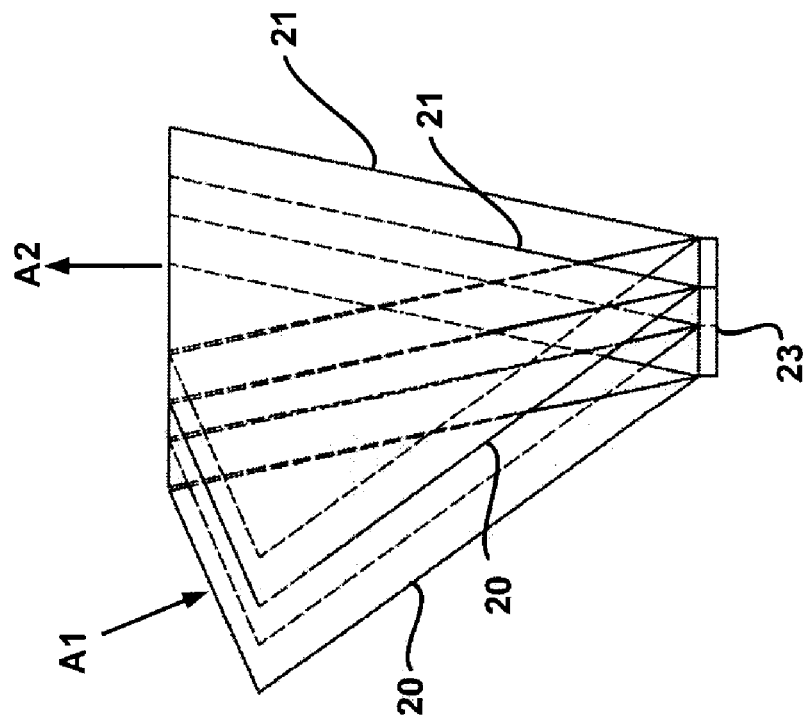
Figure 6

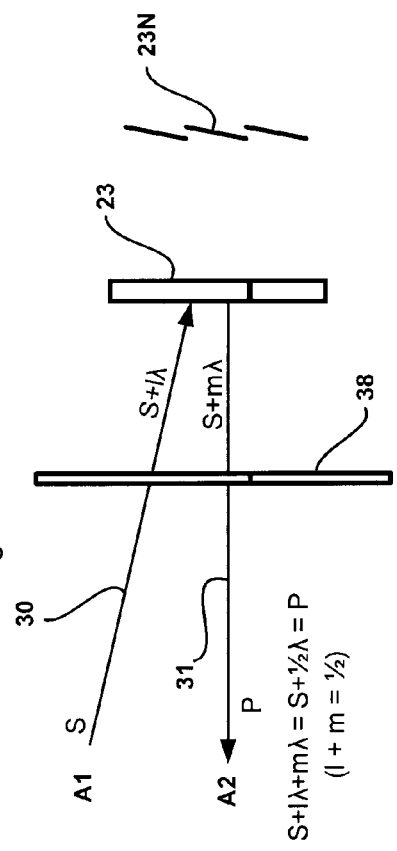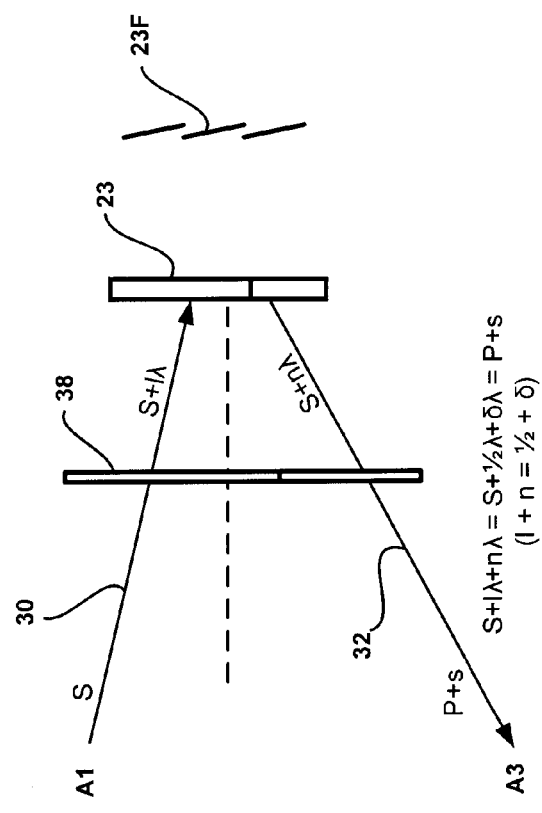

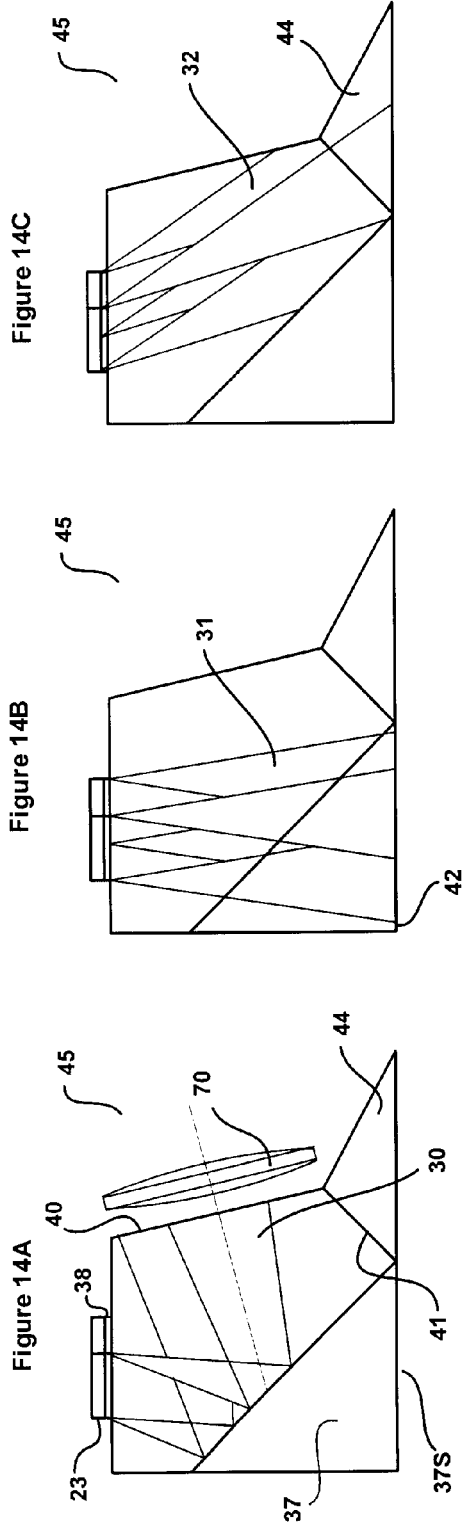

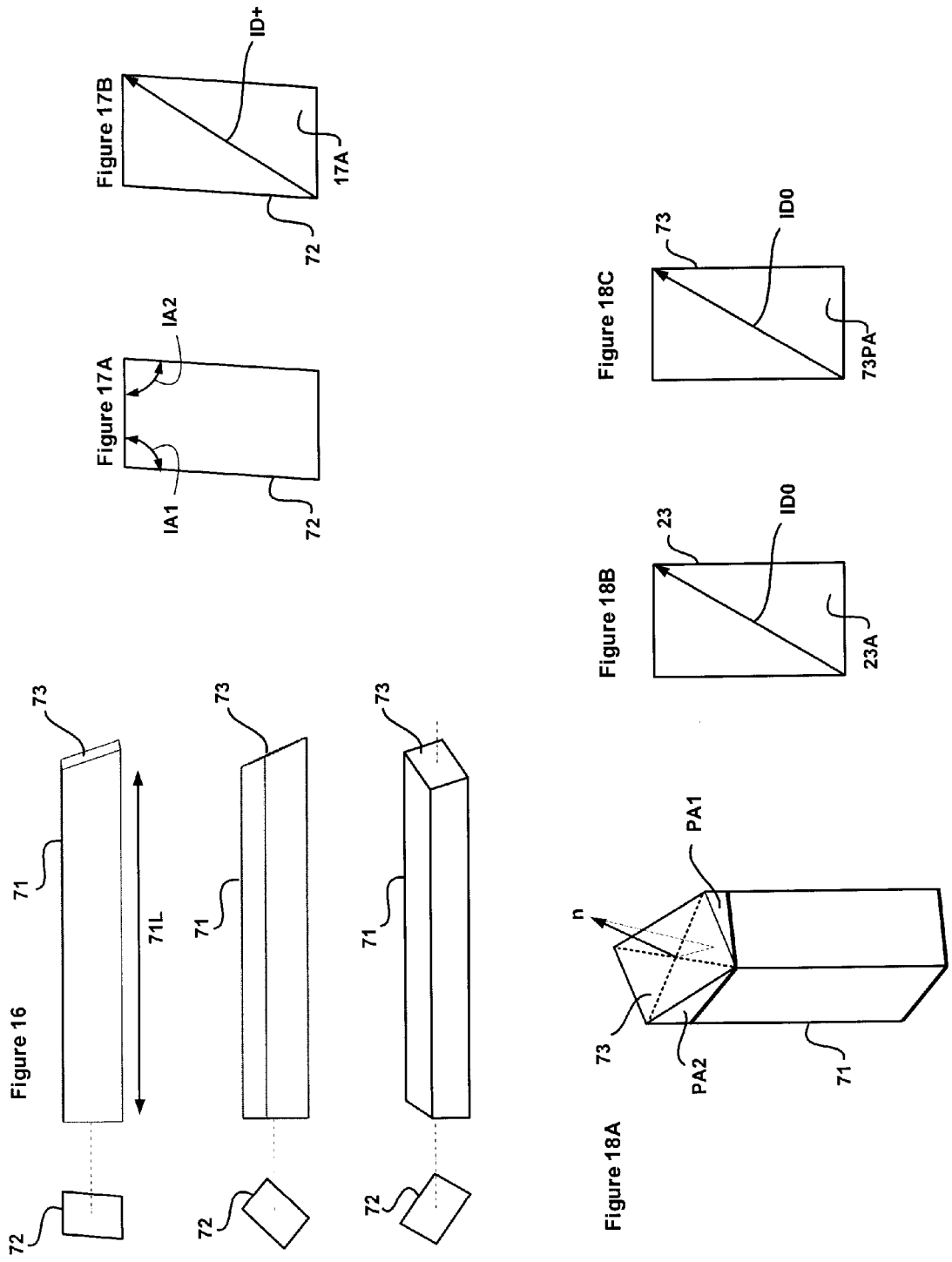

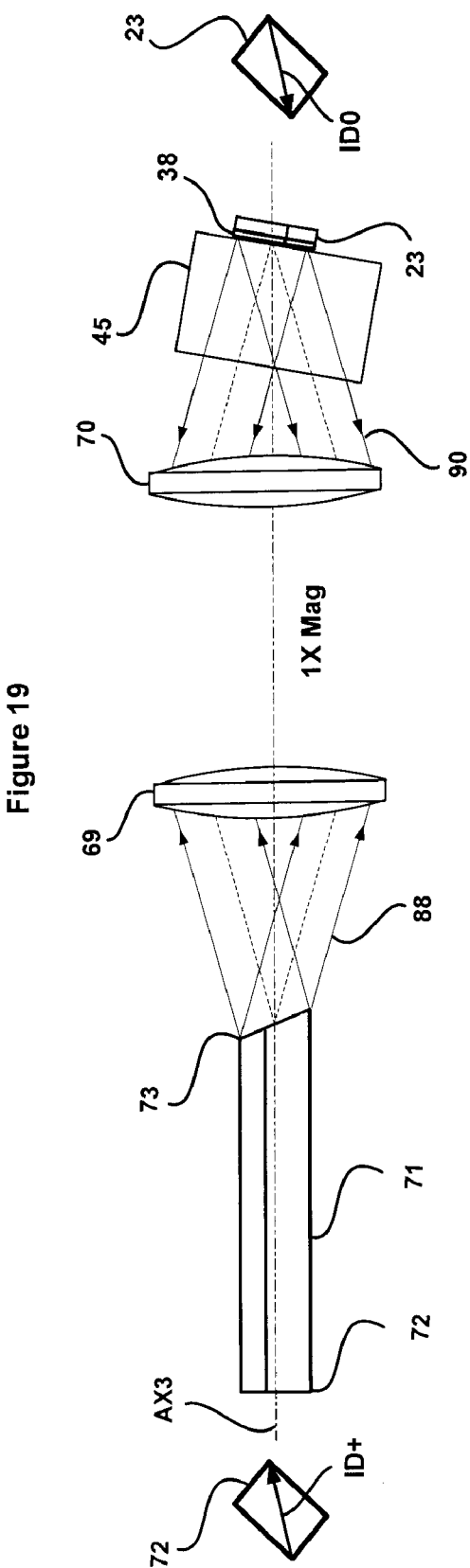

SINGLE MEMS IMAGER OPTICAL ENGINE

CROSS-REFERENCE TO RELATED APPLICATIONS

This application claims priority to U.S. Provisional Application Ser. No. 60/686,155, filed May 31, 2005. Priority to this prior application is expressly claimed, and the disclosures of respective applications are hereby incorporated by reference in its entirety.

FIELD

The present disclosure relates generally to optical engines, but not exclusively, to the optical engines for projection systems using micro-electrical mechanical ("MEMS") devices.

BACKGROUND

High definition television systems and other high-resolution display devices such as computer monitors are increasingly popular with consumers. Various technologies exist that allow display devices to create images. Rear projection displays based on microdisplay devices have recently gained in popularity. Various types of microdisplay devices are available. One type of microdisplay, MEMS, are imagers having arrays of movable mirrors fabricated thereon that reflect light beams that are directed at them.

A display device cannot create viewable images using microdisplays alone. To create a viewable image, a microdisplay device such as a MEMS imager and an optical engine are required. Traditional optical engines used with MEMS imaging devices suffer from many drawbacks, including poor brightness, contrast and color palette. There is a need for an engine that solves improves the performance of all of these, as well as other, factors.

SUMMARY

A flexible single imager optical image projection engine architecture is disclosed, for use with a field-sequential deflecting micro-mirror imager known as a reflective MEMS device (Micro-Electro-Mechanical System). The architecture is purely telecentric, but provides over twice the image contrast at higher output power in comparison to the prior art reference designs of either telecentric or non-telecentric types. In addition to these performance improvements, the architecture also eliminates problems encountered in prior art optical engines such as trade-off between output power vs. contrast vs. image uniformity, as well as producing overall superior image performance without sacrificing simplicity. The advantages of the optical engine taught herein are enabled by the use of specific light polarizing components in the illumination and imaging stages of the optical engine, despite the fact that the MEMS imager itself does not require polarized light to form an image as is the case with Liquid Crystal based imagers. In the disclosed optical engine, polarization components are not used as image forming gray scale elements, but used instead as direction selecting switches, enabling a high degree of isolation between angularly separated beams that is not possible in prior art optical engines.

In one embodiment described herein, optical imaging apparatus for MEMS imaging devices is disclosed. The apparatus has a polarizing beam splitter (PBS) prism having an entrance face substantially perpendicular to an optical axis, an imager face adjacent the entrance face, a dump exit face adjacent the entrance face. The PBS prism also includes an output face adjacent the dump exit face and substantially parallel to the imager face. The PBS prism also has an inert face adjacent to and substantially perpendicular to the imager face. The inert face is also adjacent to the output face;

In an embodiment, the apparatus includes a quarter-wave retarder affixed to the imager face and a MEMS imaging device affixed to the quarter-wave plate. MEMS devices have an array of selectively addressable mirrors thereon, each of which have an on state and an off state.

In an embodiment, the PBS further includes a PBS hypotenuse extending from where the dump exit face meets the output face to a location on the inert face. The PBS hypotenuse is arranged and constructed such that a light beam having a first polarization state, e.g., S polarization, entering the entrance face reflects off of the PBS hypotenuse towards the imager face. Light beams reflecting from the selectively addressable mirrors of the MEMS device in the on state have a second polarization state, e.g., P polarization, and are transmitted through the PBS hypotenuse to the output face.

In an embodiment, the PBS hypotenuse is arranged and constructed such that light reflecting from the selectively addressable mirrors of the MEMS device in the off state and have a mixture of both first polarization and second polarization light beams. These light beams are transmitted towards the dump exit face.

In an embodiment, the optical imaging engine also comprises a light trap affixed to the PBS prism at the dump exit face. This light trap is comprised of a first absorptive waveguide wall and a second absorptive waveguide wall. The first absorptive waveguide wall and the second absorptive waveguide wall arranged such they form a form a taper angle where they meet.

Note that the taper angle is selected such that the first absorptive waveguide wall and the second absorptive waveguide wall exceptionally absorb rays from the widest range of angles incident thereon.

In an embodiment, an optical imaging apparatus comprises a first lens perpendicular to a first optical axis and a PBS cube having a PBS beamsplitting hypotenuse that reflects light beams having a first polarization state along a second optical axis. The second optical axis is perpendicular to the first optical axis. The PBS beamsplitting hypotenuse transmits light beams having a second polarization along the first optical axis In an embodiment, a turning prism is affixed to the first PBS cube. This turning prism receives light beams having the first polarization state and twists and reflects light beams having the second polarization state along a third optical axis.

In an embodiment, a second lens receives light beams having the second polarization state along the first and third optical axis and focuses light beams from the first optical axis to a first focusing point and focuses light beams from the second optical axis to a second focus point.

In an embodiment, a integration tube having an entrance face is included. The first focus point and the second focus point overlap on the entrance face. The integration tube further comprising an exit face.

In an embodiment, a condenser receives light beams having the second polarization output from the exit face of the integration tube and transmits light beams o an imaging stage along a fourth optical axis.

The above and other preferred features of the invention, including various novel details of implementation and combination of elements will now be more particularly described with reference to the accompanying drawings and pointed out in the claims. It will be understood that the particular methods and circuits embodying the invention are shown by way of illustration only and not as limitations of the invention. As will be understood by those skilled in the art, the principles and features of this invention may be employed in various and numerous embodiments without departing from the scope of the invention.

BRIEF DESCRIPTION OF THE DRAWINGS

FIG. 3 depicts angular rotation orientation 19 relative to imager 23, of an illumination cone of light 20, an output or 'on-state' cone of light 21, and a blocked or 'off-state' cone of light 22, impinging on a point on imager 23, which is standard to the MEMS imager optical engine in the prior art. Cone reference diagram 21R depicts how cone angle 18 is measured.

FIG. 4 illustrates the angular size and angular axes relative to imager 23, of the illumination cone of light 20 at A1, the output or 'on-state' cone of light 21 at A2, and the blocked or 'off-state' cone of light 22 at A3, standard to the MEMS imager optical engine used in the prior art.

FIG. 5 illustrates the angular size and angular axes relative to imager 23 of the illumination cone of light 30 at B1, the output or 'on-state' cone of light 31 at B2, and the blocked or 'off-state' cone of light 32 at B3, which differ significantly from MEMS imager optical engines used in the prior art.

FIG. 6 depicts the telecentric property of the illumination cone of light 20 and output or 'on-state' cone of light 21 relative to the imager 23, shown by incidence angles A1 for all incident cones and angle A2 for all reflected output, or 'on-state' cones.

FIG. 7 illustrates the effect of a quarter-wave retarder used to switch polarizations between incident beam 30 and output beam 31 after reflection at imager 23.

FIG. 8 illustrates the effect of a quarter-wave retarder used to switch polarizations between incident beam 30 and the dumped, 'off-state' beam 32 after reflection at imager 23.

FIG. 14A illustrates in plan view, the position of the second condenser lens 70 and illumination cones 30 within complete PBS prism assemblage 45.

FIG. 14B illustrates in plan view, output 'on-state' cones 31 within complete PBS prism assemblage 45.

FIG. 14C illustrates in plan view, dumped 'off-state' cones 32 within complete PBS prism assemblage 45.

FIG. 15A illustrates in oblique view, the position of illumination light cones 30 within complete PBS prism assemblage 45.

FIG. 15B illustrates in oblique view, the output 'on-state' light cones 31 within complete PBS prism assemblage 45.

FIG. 15C illustrates in oblique view, the dumped 'off-state' light cones 32 within complete PBS prism assemblage 45, and their eventual gathering in absorptive waveguide trap 42.

FIG. 16 depicts three rotational views of special integration tube 71 with parallelogram cross-section entrance face 72 and compound section angle exit face 73.

FIG. 17A illustrates special integration tube entrance face 72, and the location of the parallelogram principle angles IA1 and IA2.

FIG. 17B illustrates entrance face diagonal size ID+.

FIG. 18A depicts a close oblique view of special integration tube 71, showing exit face plane 73 and plane normal n tilted at a compound angle defined by angles PA1 and PA2.

FIG. 18B illustrates imager 23 active area 23A and diagonal size ID0.

FIG. 18C illustrates special integration tube exit face 73 projected active area 73PA and diagonal size ID0.

FIG. 19 illustrates the unity magnification telecentric arrangement wherein the exit face 73 of special integration tube 71 is imaged through prism assemblage 45 onto imager 23 at 1X magnification.

Figure 1:
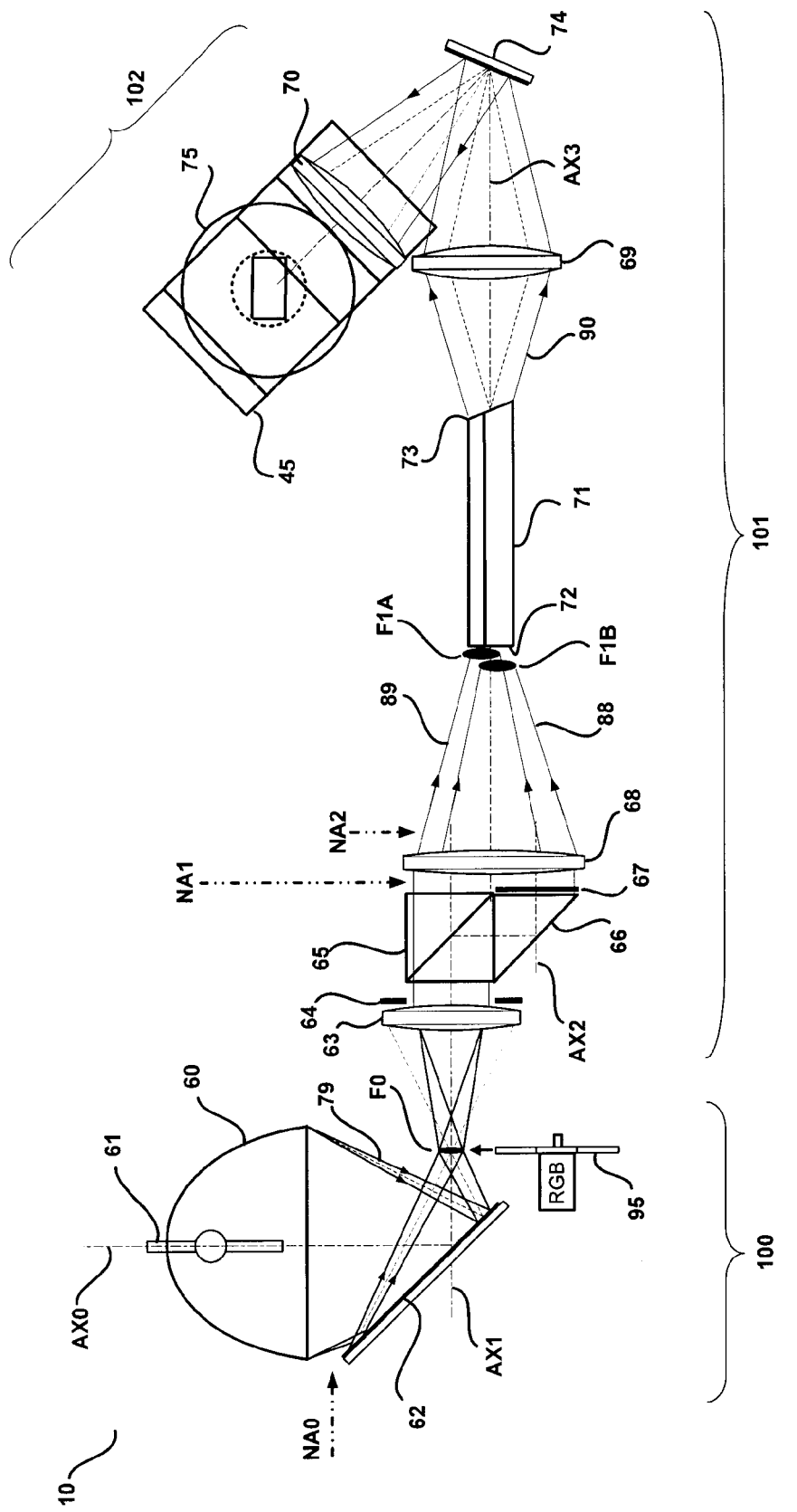
FIG. 1 depicts the color wheel version of an optical engine 10, showing collection stage 100, illumination stage 101, and imaging stage 102.

It should be noted that the figures are not drawn to scale and that elements of similar structures or functions are generally represented by like reference numerals for illustrative purposes throughout the figures. It also should be noted that the figures are only intended to facilitate the description of the preferred embodiments.

DETAILED DESCRIPTION

FIG. 1 through FIG. 18 disclose a optical image projection engine architecture based on a single MEMS microdisplay imager device, which is a deflecting mirror microdisplay usually embodied through processes known as Micro-Electro-Mechanical System (MEMS).

One embodiment of an Optical Engine (OE) 10 is disclosed in FIG. 1. It is comprised of three main modules, the collection stage 100, the illumination stage 101 and the imaging stage 102.

Collection Stage

The structure of collection stage 100 can use conventional methods and thus can comprise an arc lamp light source 61 and ellipsoidal reflector 60, the combination of which produces an image of the arc at the ellipsoid's secondary focus F0 via collection stage numerical aperture NA0. The ellipsoid's geometric and reflective properties can be optimized by methods well known in the trade such that the total flux and volumetric extent of the focal spot F0 are as close to the theoretical maximums as possible for an etendu point established by the active area of the imager. Inclusion of optional cold mirror 62 further reduces deleterious UV and IR arc lamp emissions at the engine entrance, and a packaging advantage, since the collection stage can be spun to any position about collection stage output axis AX1. Ellipsoidal reflector 60 is depicted to deliver a collection numerical aperture corresponding to f/1.0, but any collection speed can be so designed.

Figure 2:
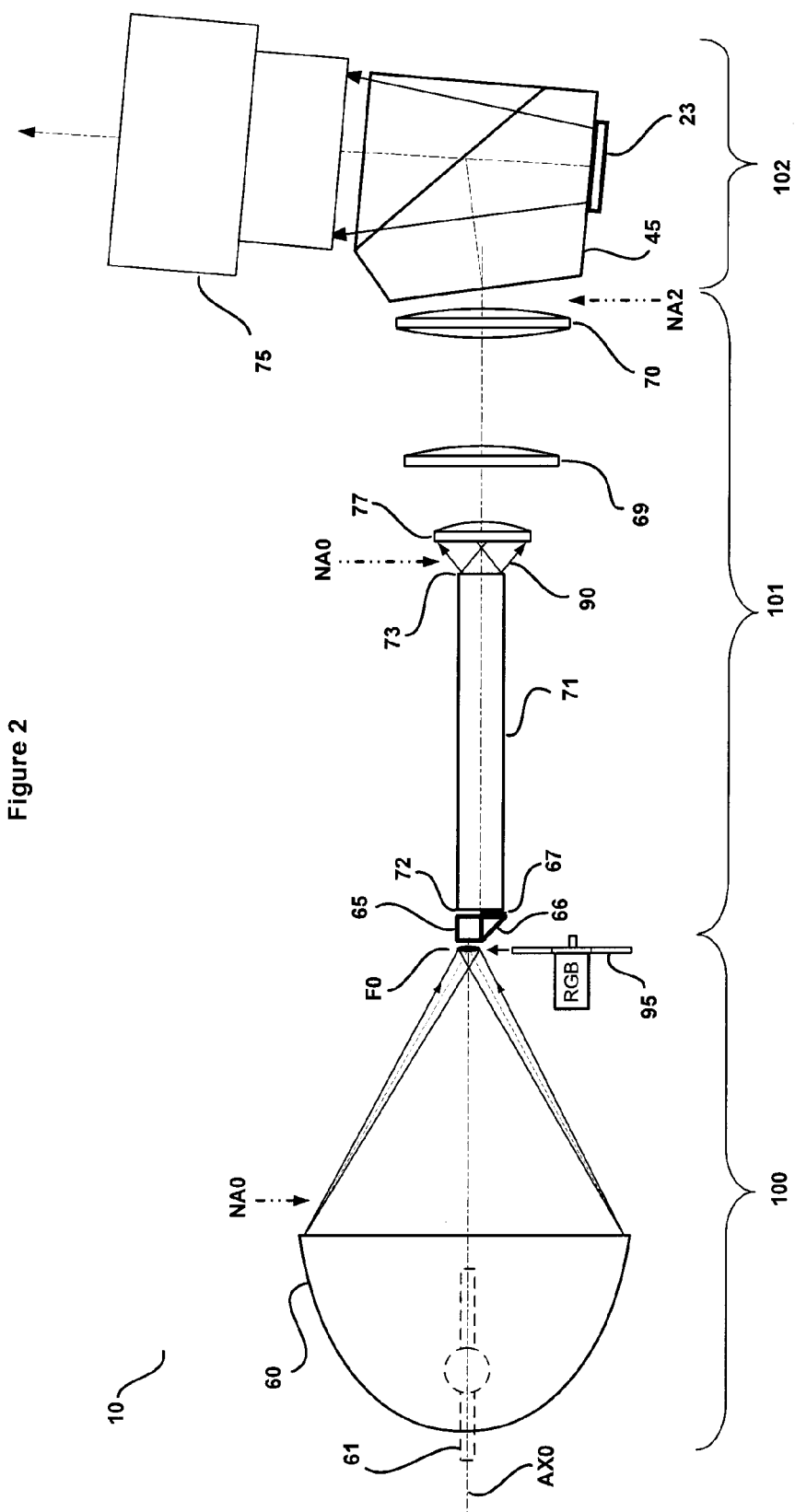
FIG. 2 shows an alternate illumination stage.

Still referring to FIG. 1, optional color wheel 95 is shown at focus F0, producing sequential red, green and blue color transmission in a way that is common in the art. Some form of sequential color transmission is needed to produce color images for those optical engines using a fewer than three MEMS devices. Referring to FIG. 2, which is a second version of the MEMS optical engine invention, wherein Numerical Aperture transformation lens components have been replaced by non-transforming components operating at reflector Numerical Aperture NA0, and with transformation NA2 rather achieved at the condenser.

MEMS Imaging Devices

The fundamental optical function of the MEMS imager in an engine is depicted in FIGS. 3-6. MEMS imagers are manufactured with a specific micro-mirror deflection angle, the extent of which is substantially limited by cost and performance factors. The maximum mirror deflection angle of a production MEMS does not usually exceed 12° on either side of the mirrors' 0° center or 'flat' state. Because MEMS imagers are usually bi-stable digital devices, there is no gradation in the deflection angle and the mirror is operated at either one or the other of its angular extremes (except during the short travel time between them).

Referring to FIG. 3, the three fundamental light cones 20, 21 and 22 produced by prior art optical engines of the telecentric type are illustrated in relation to the single MEMS imager 23, shown in plan view. While there are similar sets of cones operating on all points in the active area of imager 23, only the set operating on a single point of imager 23 are shown. Within these cones of light, rays of a range of angles are confined between the cone's center axis and its cone angle extent 18. Light cone 20 is the illumination cone, incident to the imager at an angle and originating from engine's illumination stage. Cone 20 is the source of all light that is angularly processed by the imager. Light cone 21 is the reflected output from the imager's 'on state,' the result of a micro-mirror deflecting to the first of its two 12° angular positions. This has the effect of swinging the light from illumination cone 20 into the position of cone 21 at 0°, or optically 'normal' to the imager plane, into the projection lens pupil and out of the engine toward the screen. Light cone 22 is the reflected 'off state' light that appears when the micro-mirror deflects to the second of its two 12° extreme positions. This light is of no use and must be efficiently dumped out of the system in order to avoid stray light leakage into the projected image, which results in contrast lost and image washout.

Still referring to FIG. 3, light cones 20, 21 and 22 are shown aligned at angle 19 with respect to imager 23. In nearly all practical MEMS imager component products, angle 19 is substantially equal to 45°, representing the 'action axis' about which the micro-mirrors on the imager device actually tilt. Contrary to an intuitive view that suggests these mirrors should tilt up-and-down or left-and-right along an axis parallel to the micro-mirror's perimeter edges, the deflection axis is set at 45° by the manufacturer for the very important optical reason of keeping diffracted light out of the direction tangential to the action axis. Light diffracts unavoidably off the tiny pixel edges on all microdisplay types and produces uncontrolled deleterious light in directions tangential to these edges. Rotating the mirror tilt action axis to 45° with respect to the pixel edges effectively rotates the diffraction field out of the exit pupil of the system to avoid deleterious leakage and washout effects.

This off-axis illumination and on-axis output method, where the illumination is passively reflected into a natural dark state field until mirror deflection swings a portion of it into the exit pupil, is commonly referred to as 'dark field illumination.'

Still referring to FIG. 3, all light cone angular extent values 18 are reference to the cone's center axis 17. Angle 18 is commonly referred to a cone's geometric 'half-angle,' which coincides with the convention for Numerical Aperture.

FIG. 4 illustrates two other views of the light cone positions and extent found in prior art micro-mirror engines, whose micro-mirror imagers operate at 12° deflection. Angle A1 represents the position angle of illumination beam 20 center axis and A2 represents the position angle of output 'on-state' cone 21 center axis. Angle A3 is the position angle of the center axis of the dumped 'off-state' cone. In telecentric systems, A2=0°. A2 and A3 are set by the tilt angle of the imager mirrors, which is most commonly:

$A1=2\times12°=24°$ in air, $A2=0°$, $A3=24°+24°=48°$ in air.

When these deflection angles transmit through glass, they must be adjusted by Snell's law.

The proximity of cone position A1 and A2 in prior art telecentric engines can be understood by referring to both FIG. 3 and FIG. 4. For the imager's micro-mirror tilt angle geometry to operate properly, the illumination cone 20 and output cone 21 must be 24° apart in air without overlap. Overlap of these cones would create leakage in the engine from source to output. In order to juxtapose these adjacent cones without overlap, the angular extent 18 of cones 20 and 21 cannot exceed 12°. A 11.8° numerical aperture in air corresponds to an optical speed of f/2.4. The practical result of this is the limitation that the operating speed of the prior art telecentric optical engine cannot exceed f/2.4. FIG. 5 depicts the attempt to increase the prior art telecentric engine operating speed to f/1.7, comprised of 16.3° illumination and output cone angles 30 and 31, producing overlap and causing the engine to cease functioning properly.

Beam telecentricity is a necessary condition in microdisplay based optical engines for use in, for example, rear projection television, because the condition of high angular uniformity in the telecentric beam converts to high uniformity in the projected image luminance and dark states. While there are also 'non-telecentric' engine designs in the prior art that sacrifice telecentricity in order to widen the fundamental light cones and improve output, their image uniformities are not suited to television image standards. Thus, the optical engine taught herein is telecentric.

FIG. 6 illustrates the condition of beam telecentricity, formed at the focus of the incident beam impinging on imager 23, here shown incident at each of the 4 corners of imager 23. The focused beam is comprised of incident illumination light cones 20 with center axis angle A1=24°. The requirement of telecentricity is satisfied because all such illumination cones 20 have the center axes angle A1=24°, regardless of their location on the active area of imager 23. Likewise upon reflection from imager 23, the telecentric beam proceeds away from imager 23 as output cones 21, with all such cones having center axis angle A2=0°.

Prior art engines require that the cones of light incident to and reflected from the MEMS imager operate at cone angles and axial separations that are rigidly defined by the micro-mirror deflection angle, limiting the numerical aperture to cones sizes that would not otherwise overlap or interfere disparagingly as shown in FIG. 5. The unique concept described herein of using polarization techniques as a direction selective isolation switch enables the light collection cones to be substantively larger than prior art systems and hence an optical engine that is capable of much higher output.

Imaging Stage

The single MEMS imager optical engine 10 disclosed herein relies on polarization components to operate. FIG. 7 and FIG. 8 depict the function of quarter-wave retarder 38, a polarization sensitive component. Referring to FIG. 7, quarter-wave retarder (QWR) 38 is placed directly in front of imager 23 and at the proper rotation of its birefringent axis. Imager 23 is electrically switched to its output or 'on-state' 23M such that upon transmission through quarter-wave retarder 38, reflection from imager 23, and transmission again through quarter-wave retarder 38, incident purely S-polarized beam 30 undergoes a complete and reasonably accurate half-wave retardance (½λ), causing incident purely S-polarized illumination beam 30 to emerge as purely P-polarized output beam 31.

FIG. 7 illustrates how the precise retardance each of the two beams undergoes depends on their path lengths l and m through the quarter-wave retarder material. Since beams 30 and 31 are not parallel, each beam will traverse slightly different path lengths as they travel in opposite directions through quarter-wave retarder 38. As long as the sum of the path lengths equal ½λ, S-polarization will be suitably converted to P-polarization. Thus, $$l+m=½$$

$$S+l\lambda+m\lambda=S+½\lambda=P$$

FIG. 8 illustrates the same process occurs as imager 23 is electrically switched to its 'off-state' and incident illumination beam 20 is swept to the dumped or 'off-state' position, becoming beam 32 that must be dumped from the system. In this case the two beams 30 and 32 are further from parallel than are beams 30 and 31, thus return beam 32 traverses a longer path length n>m in quarter-wave retarder 38, producing additional retardance δλ beyond ½λ.

$$l+n=½+δ$$

$$S+l\lambda+n\lambda=S+½\lambda+δ\lambda=P+s$$

This extra retardance in beam 32 produces a small S-polarized component along with the large P-polarization component in dump beam 32. Therefore purely S-polarized illumination beam 30 is ideally converted by quarter-wave retarder 38 to purely P-polarized output beam 31, but purely S-polarized illumination beam 30 is converted by quarter-wave retarder 38 to an impurely P-polarized dump beam 32 with some s pollution (P+s).

Figure 10:
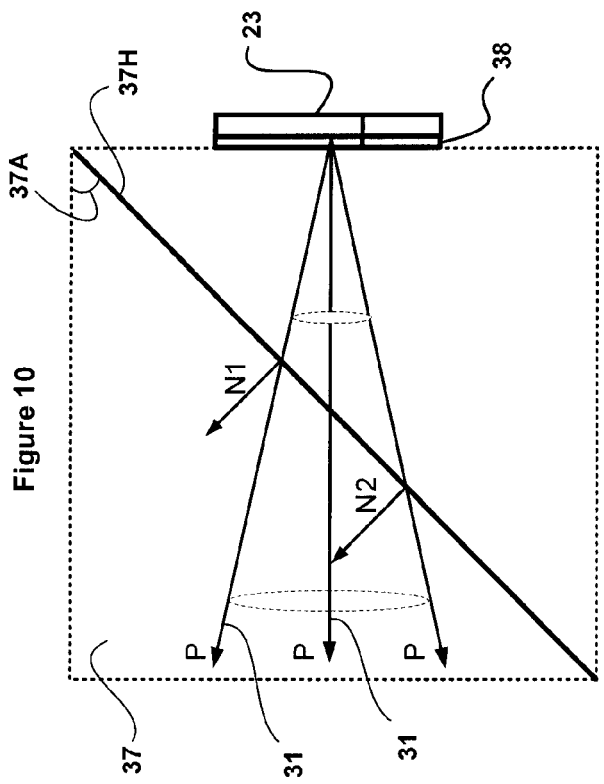
FIG. 10 depicts rays of output 'on-state' light cone 31 transmitting through hypotenuse plane 37H of glass PBS prism 37 at varying angles relative to plane normal N.
Figure 9:
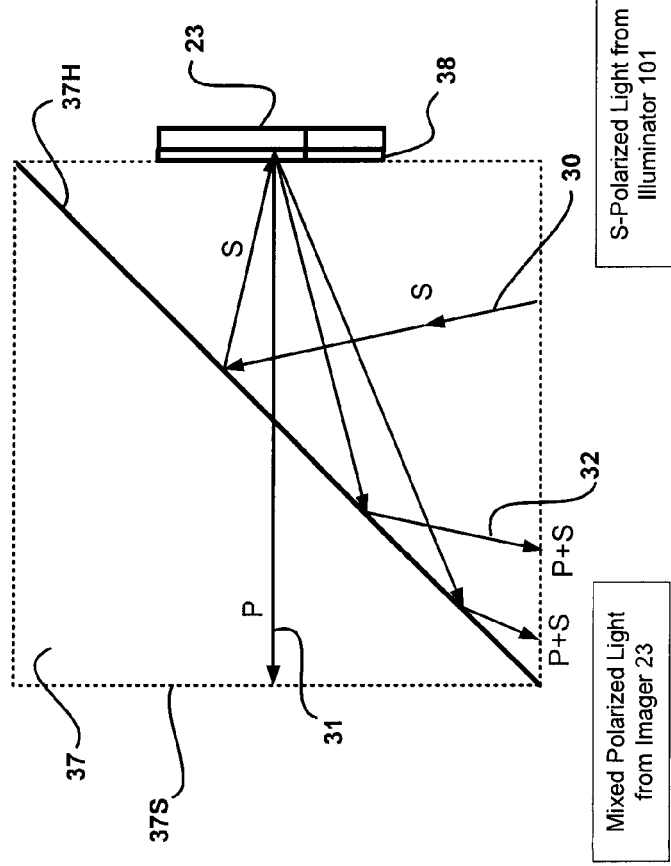
FIG. 9 illustrates the polarization states of incident cone 30, reflected output cone 31, and dump cone 32 upon interaction with imager 23, Polarization Beam Splitter ("PBS") 37 and quarter-wave retarder 38.

Another polarization component necessary for optical engine 10 to function is seen in FIG. 9 and FIG. 10, which is the imaging stage polarization beam splitter (PBS) prism 37. FIG. 9 depicts purely S-polarized illumination beam 30 entering PBS 37 at the proper angle A1=24° in air, that has been corrected for the PBS glass index by Snell's law. S-polarized incident illumination beam 30 reflects off PBS hypotenuse 37H, traverses quarter-wave retarder 38 and falls incident onto imager 23. Output beam 31 is reflected from imager 23 in the purely P-polarized state and plunges through PBS hypotenuse 37H. PBS hypotenuse 37H design angle 37A is shown here to be 45°, however the PBS component can be designed with any reasonable hypotenuse angle 37A suited to PBS glass index and the fundamental ray angles.

It is undesirable for light beams reflected by the imager 23 in the off-state to plunge through PBS hypotenuse 37H. FIG. 9 illustrates the angular separation of output on-state beam 31 from dumped off-state beam 32 via a special property of the 'McNeill' type PBS with dielectric thin film stacks specifically designed for this principle. In such a case, neither the S-Polarized rays and P-Polarized rays contained in dump beam 32 plunge through 37H to mix with output beam 31, but rather totally reflect at hypotenuse 37H and change direction away from output beam 31. Thus, light that can have undesirable effects on the projected image is not passed through the optical engine. Instead, it is prevented from entering the projected image.

The output on-state light cone center and marginal rays 31 within PBS prism 37 is illustrated in FIG. 10 relative to PBS hypotenuse 37H plane normal N1. Although a numerical aperture corresponding to imaging stage speed f/1.7 is depicted, the PBS component can be configured for any chosen imaging stage output speed. Each ray within output cone 31 forms a particular angle with hypotenuse 37H plane normal N1. The dielectric film stack on PBS hypotenuse 37H in relation to the PBS glass index is designed such that all rays within the angular margins of output on-state cone 31 fall within a sufficient angle range to successfully plunge through PBS hypotenuse 37H toward the engine output. As depicted in FIG. 9, dumped off-state rays 32, which form only steep angles with plane normal N2 and lie beyond the angular margins of output on-state rays 31, do not successfully plunge through hypotenuse plane 37H and totally reflect away from the output, regardless of whether the dumped off-state rays 32 are S-polarized pollution or P-polarized.

Angular separation of output on-state beam 31 from dumped off-state beam 32, as well as the ultimate termination of the exit path of dumped off-state beam 32 and removal of stray light, is fundamental to image quality. The extent to which this separation is accomplished is of primary concern. The disclosed optical engine 10 utilizes a unique property of PBS 37 that enables the complete angular separation of the dumped off-state beam 32 from output on-state beam 31, and assures that dumped off-state beam 32 will not directly leak into the engine's output beam 31 or contribute to leakage by the production of stray light.

Figure 11:
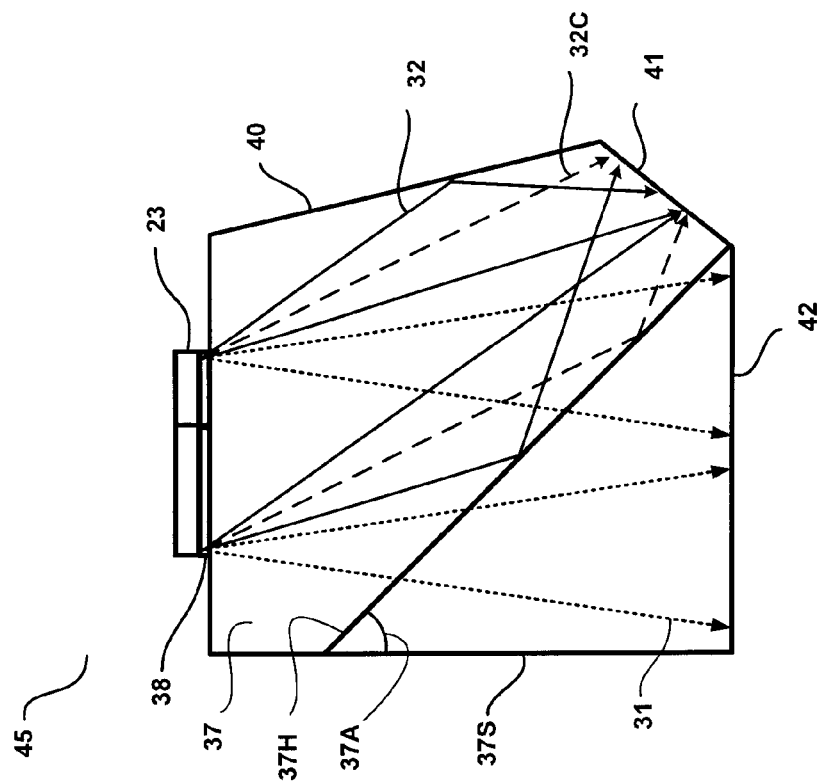
FIG. 11 depicts prism assemblage 45, where ray paths comprising the marginal cones of telecentric illumination 30 fall incident onto imager 23 attached to PBS prism 37.
Figure 12:
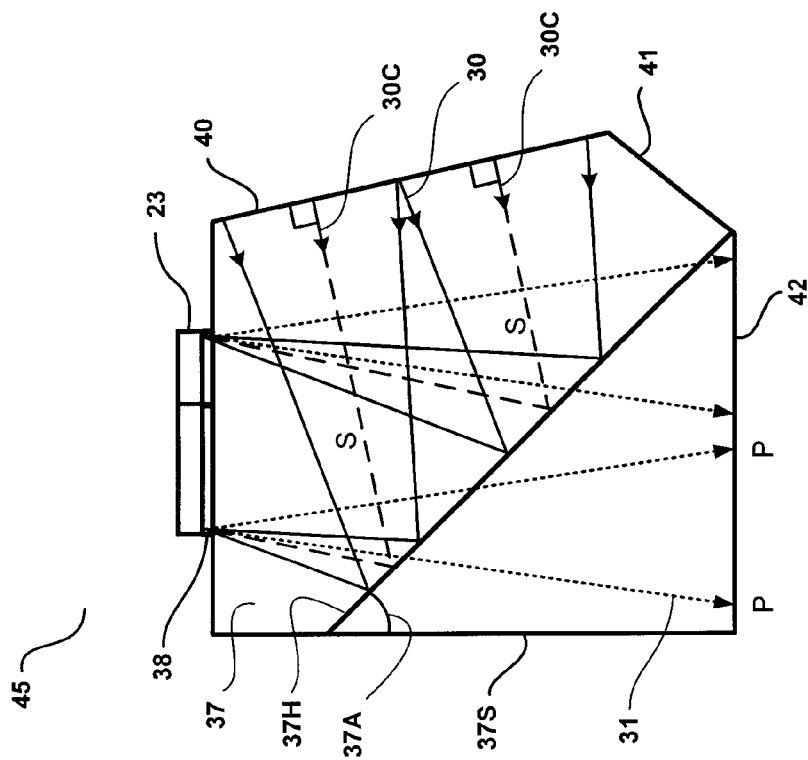
FIG. 12 depicts prism assemblage 45, where ray paths comprising the marginal cones of telecentric dumped 'off-state' light cones 32 are reflected from imager 23 attached to PBS prism 37 and channeled to exit surface 41.

To simplify the explanation herein, the glass PBS 37 in FIG. 9 is illustrated with arbitrary orientation and square cross-sectional shape 37S outlined by dotted lines. FIG. 11 and FIG. 12 now disclose the actual orientation and PBS shape 37S, with MEMS imager 23 and quarter-wave retarder in place relative to the PBS prism assemblage on an imager face 39. A preferred embodiment of PBS prism 37 defines the cross-sectional perimeter shape 37S for ideal operation of optical engine 10, though all quantitative design factors can be varied parametrically by means well known in the trade.

Referring to FIG. 11, preferred embodiment prism entrance face 40 is definitively set at such an angle as to be perpendicular, i.e. optically normal, to incident central chief rays 30C. PBS hypotenuse 37H, designed with hypotenuse plane angle 37A, reflects S-polarized incident telecentric illumination beam 30 towards and through quarter-wave retarder 38 onto imager 23. Upon telecentric reflection into the imager's on-state, S-polarized incident illumination beam 30 is converted by quarter-wave retarder 38 to P-polarized output beam 31, which plunges through PBS hypotenuse 37H and exits prism assemblage 45 through output face 42. PBS hypotenuse 37H preferably extends from one edge of a dump exit face 41 to an appropriate location on an inert face 35.

Telecentric reflection from imager 23 into the imager's off-state is illustrated in FIG. 12. Reflected S-polarized incident illumination beam 30 is converted by quarter-wave retarder 38 to mixed (P+S)-polarized dumped beam 32 and deflected away from output face 42 into sufficiently high angles relative to PBS hypotenuse 37H such that the hypotenuse totally reflects these rays of both polarizations away from output face 42 and toward dump exit face 41. Other dumped rays comprising beam cone 32 are deflected further away from hypotenuse 37H and toward dump exit face 41. Still other rays, though only a small portion of the total rays comprising dumped beam cone 32, are deflected directly toward PBS prism entrance face 40, where, because of their steep angles, are totally internally reflected by the prism's convenient tilted glass-air interface and directed toward dump exit face 41. The result of this process is that all deleterious light from the imager's dumped off-state is channeled to a location in prism assemblage 45 where it exits without going stray or leaking into output beam 31, an aspect of optical engine 10 that produces the highest possible contrast and image quality.

FIG. 11 and FIG. 12 depict numerical aperture 0.2822 corresponding to f/1.7, although any practical engine optical speed can be so designed.

Figure 13:
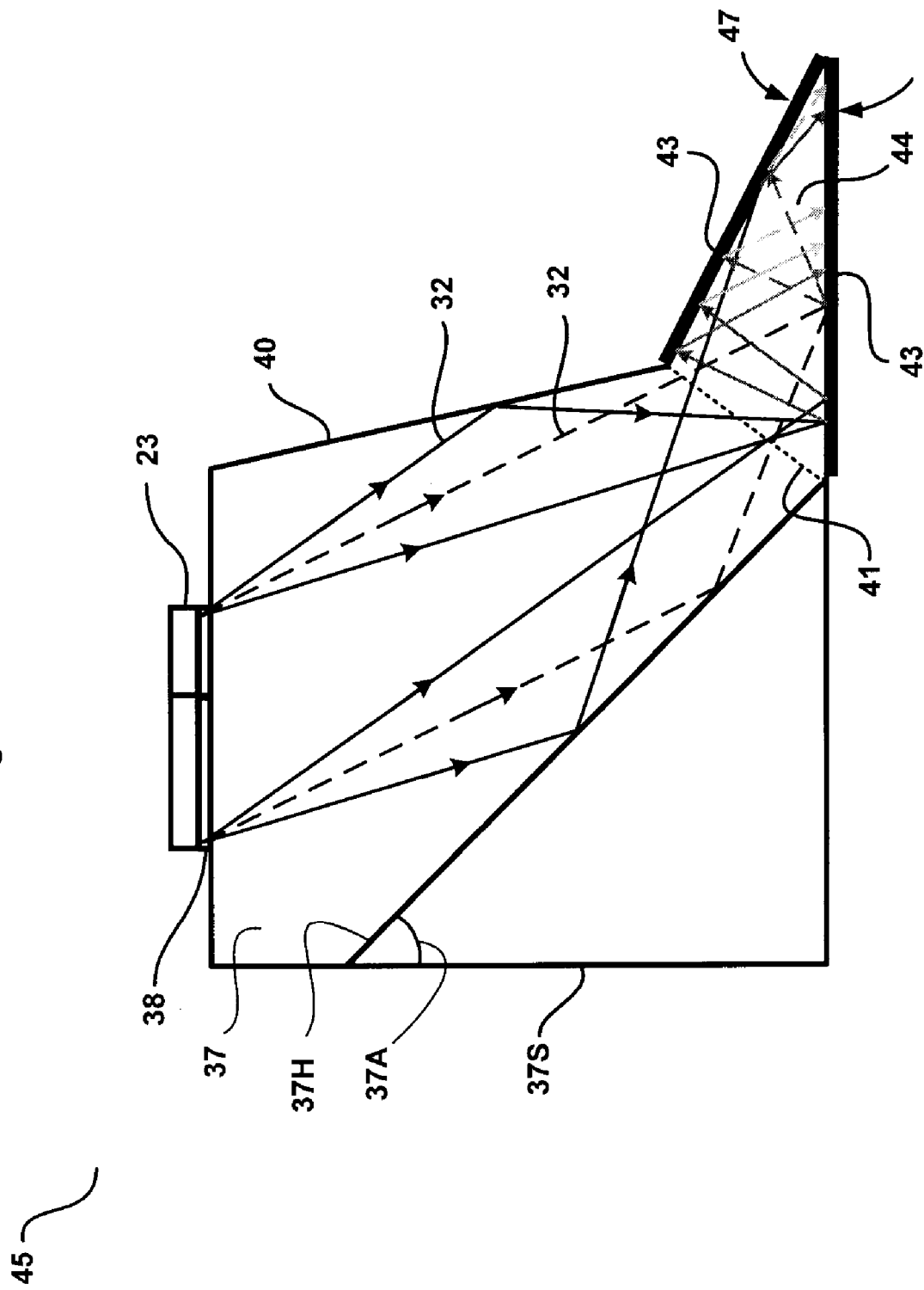
FIG. 13 also depicts prism assemblage 45, where the ray paths comprising the marginal cones of telecentric dumped 'off-state' light cones 32 channeled out of PBS prism 37, plunge through index coupled surface 41 to be absorbed in waveguide light trap 42.

FIG. 13 discloses tapered light trap 44 attached to PBS prism 37 at dump exit face 41. Light trap 44 has walls 43 preferably comprised of tapered glass or plastic absorptive waveguide that acts as the final destination of all dumped off-state light 32 in prism assemblage 45. Light trap taper angle 47 determines the number of absorptive reflections in the trap, and the trap can be either optically coupled to prism dump exit face 41, or exist as a mere extension of the same physical piece of glass comprising prism 37 in which case there is no exit face 41, or positioned in place with an air gap and properly designed anti-reflection coatings on exit face 41. In the case where the trap is merely part of the glass piece comprising the PBS. All exterior surfaces of the glass or plastic tapered light trap 44 must be coated with flat black paint or other light absorptive material that is optically coupled to the waveguide surfaces such that the absorptive material spoils or frustrates internal reflection in the trap. The light absorption material or paint must be optically coupled to all surfaces comprising trap 44 (except its entrance surface), including any unpolished inactive or ground areas. After all rays of dumped beam 32 have been channeled through prism dump exit face 41 and into tapered light trap 44, complete ray absorption occurs during each and every interaction with its interior surfaces.

FIGS. 14A, 14B and 14C are plan views of complete prism assemblage 45 separately depicting the three fundamental beams associated with MEMS engine operation, each beam comprised of light cones acting at the four corners of imager 23. FIGS. 15A, 15B and 15C are oblique views of complete prism assemblage 45 depicting the same cone sets.

FIG. 14A and FIG. 15A illustrate the off-axis incident illumination cones 30 inside prism assemblage 45. Second condenser 70 is shown in position relative to PBS prism incident face 40. FIG. 14B and FIG. 15B illustrate the output on-state cones 31 inside prism assemblage 45. FIG. 14C and FIG. 15C illustrate the dumped off-state cones 32 inside prism assemblage 45 terminating in light trap 44.

Illumination Stage

FIGS. 1 and 2, along with FIGS. 16-20 disclose the illumination stage 101 matched to the standard collection stage 100 and imaging stage 102 disclosed herein. The purpose of the illumination stage 101 is to transform the collected light for proper illumination of the imaging stage in all aspects. These aspects are beam polarization, numerical aperture transformation, de-circularization, spatial integration, telecentricity, and imager illumination.

Referring to FIG. 1, through arc lamp image Gaussian focus F0, illumination stage 101 receives collected light from collection stage 100 at collection numerical aperture NA0. Since prism assemblage 45 comprising imaging stage 102 operates with polarization components, illumination stage 101 must polarize all collected light. However polarization of the collected beam must be done in such a way as to produce as little polarization loss as possible in order to keep flux levels high. A polarization conversion system (PCS) is used to achieve this, according to methods well known in the trade.

A high conversion percentage of un-polarized light to polarized light using PCS methods is depicted in FIG. 1. Along primary axis AX1, field lens 63 reduces the NA from collection stage Gaussian focus F0 to a sufficiently high f/# and corresponding image area commensurate with etendu principles. f/12 is shown, but any allowed transformation can be chosen. Across the direction of the PCS conversion, Gaussian field stop aperture 64 limits the transmitted field distribution to a central portion of the Gaussian beam where flux density is high. This produces a reduced aperture area with higher flux density than the full aperture, and this high flux area pupil is essentially doubled back to approximately its original size by illumination polarization beam splitter prism (PBS) 65 and turning prism 66. The P-polarized component of total flux is transmitted through PBS 65 and the S-polarized light is reflected from PBS 65, where turning prism 66 re-directs its S-polarized beam along secondary axis AX2 and through half-wave retarder 67, converting the S-polarized side of the beam to P-polarization. This process increases the desired P-polarization flux in the pupil while maintaining its area. However, constant brightness is maintained since now the beam's solid angle has been doubled, as the two beams along secondary axis AX2 and primary Axis AX1 converge to form resultant illumination stage axis AX3, and new numerical aperture NA1. NA1 is depicted in FIG. 1 to be f/6, but any allowed transformation can be chosen.

Continuing in FIG. 1, along resultant illumination stage axis AX3, illumination stage focusing lens 68 focuses transformed illumination beam NA1 to two overlapping foci F1A and F1B at entrance face 72 of special integration tube 71. In so doing, illumination beam NA1 is further transformed by focusing lens 68 to operating numerical aperture NA2 and commensurate lamp arc foci F1A and F1B via ray sets 88 and 89. Numerical aperture NA2 becomes the final operating NA of optical engine 10 and propagates through the remainder of the system to the screen. Operating numerical aperture NA2 is shown in FIG. 1 to correspond to engine operating speed f/1.7, although any operating speed can be chosen as a design parameter using methods well known in the trade.

As depicted in FIG. 1, overlapping foci secondary F1A and F1B fall incident on special integration tube entrance face 72. Special integration tube 71 performs beam de-circularization, spatial integration, telecentricity, and providing the illumination stage object field aperture. Special integration tube 71 also provides the new functions of incidence angle offset correction for MEMS imager illumination, and 1× magnification in the condenser stage that transfers ideal telecentricity to imager 23 without involving an angular transformation.

The structure and function of special integration tube 71 is disclosed in FIGS. 16-19. Special integration tube 71 forms a non-tapered waveguide comprised of two sets of parallel walls constructed as a tube with quasi-rectangular cross-section bounded by four highly reflective flat multi-layer dielectric mirrors surrounding an axial air core. Special integration air tube 71 has an entrance face 72 that de-circularizes the reflector's circular beam aperture commensurate with the engine etendu point. Tube length 71L of special integration air tube 71 removes lamp structure and integrates all rays to spatial and angular telecentricity via multiple geometric reflections. Exit face 73 of special integration air tube 71 provides an object field aperture for focus onto imager 23. Special integration air tube 71 improves over prior optical waveguides and mating condensers because the illumination beam will not come to a sharp, rectangular focus at imager 23, producing losses in output efficiency, image luminance uniformity and telecentricity.

FIG. 16 discloses new structure and functions of special integration air tube 71. FIG. 16 depicts three axial rotations and corresponding end views of entrance face 72 of special integration air tube 71. Exit face 73 forms a plane tilted at an oblique angle with respect to entrance face 72. FIG. 17A further illustrates that entrance face 72 and all congruent cross-sections along the tube are not a rectangle with four 90° corners, but rather a parallelogram with differing adjacent interior skew angles IA1 and IA2. FIG. 17B depicts entrance face 72 cross-sectional reference diagonal ID+ and total area 17A.

FIG. 18A further discloses new structure and resultant functions of special integration air tube 71, depicting a close up view of tilted exit face 73 and exit face plane optical normal n. Exit plane 73 tilt is constructed by a special angular section of the tube formed by compound tilt angle components PA1 and PA2. Tilted exit face 73 geometrically combines the tube fundamental cross-sectional parallelogram formed by skew angles IA1 and IA2, with the compound tilt angle section formed by plane angles PA1 and PA2, forming a special shape and orientation of exit face 73 such that its projection by condenser lenses 68 and 69 onto imager 23 active area from oblique off axis angle B1 produces a sharp focus of exactly rectangular shape, eliminating the de-focus and overfill loss limiting conventional integration tubes in MEMS engine applications.

FIG. 18B depicts the aspect ratio and diagonal length ID0 of imager 23 as parameters defining its active area 23A. FIGS. 18B and 18C further disclose that the image of exit face 73 as focused on imager 23 has exactly the same projected diagonal length ID0, aspect ratio and projected area 73PA as imager 23 active area 23A when exit face 73 is projected onto imager 23 active area from illumination beam center off-axis angle B1. Thus the aspect ratio and diagonal length ID+ of entrance face 72 is related to exit face 73 projected diagonal length ID0 by geometric reconstruction at the focus on imager area 23A.

The resultant projection focus geometry is illustrated in FIG. 19. Special integration tube 71 is at 45° rotation about resultant illumination stage axis AX3 and properly oriented for MEMS imager illumination. Telecentric ray bundles 88 emerge from special integration tube compound tilted exit face 73, toward first condenser 69. Condensers 69 and 70 together produce conjugate telecentric ray bundles 90, which converge through prism assemblage 45, quarter-wave retarder 38 and onto imager 23, all of which are tilted offset from axis AX3 by illumination stage incident angle B1, forming a 1× magnification rectangular real image of tube exit face 73 as a telecentric focus such that entrance face 72 diagonal ID+=imager diagonal 23 ID0.

Analogous to the hollow air core integration tube as previously described herein, there are solid glass core or plastic core integration waveguides that operate in analogous principles of total internal reflection within a dielectric material. Solid integration slabs can easily be substituted for the hollow tubes with no change in concept or means, using analogous angular calculations in refractive materials.

Optional condenser folding mirror 74 is left out of FIG. 19 for simpler illustration. Figure depicts the folded condenser section of illumination stage 101, which is only a packaging option to shorten the overall length of optical engine 10, and has no substantive bearing on the function or teachings disclosed herein.

Illumination Stage Variation

FIG. 2 depicts an alternate optical engine arrangement using conventional untapered, parallel light integration tube 71 and Polarization Conversion System 66, 67 and 68, the aggregate of which operates on untransformed Reflector 60 Numerical Aperture NA0. The transformation to NA2 achieved in FIG. 1 via transform lenses 63 and 68, is achieved in FIG. 2 via condenser stage lenses 70, 69 and 77.

Thus, a preferred optical engine architecture for MEMs devices has been described. While embodiments and applications of image projector engine architecture have been shown and described, as would be apparent to those skilled in the art, many more embodiments and applications are possible without departing from the inventive concepts disclosed herein.

The invention claimed is:

1. An optical imaging engine comprising:
   a polarizing beam splitter (PBS) prism having an entrance face substantially perpendicular to an optical axis, an imager face adjacent said entrance face, a dump exit face adjacent said entrance face, an output face adjacent said dump exit face and substantially parallel to said imager face, and an inert face adjacent to and substantially perpendicular to said imager face, said inert face also adjacent to said output face;
   a quarter-wave retarder affixed to the imager face; and
   a micro-electrical mechanical (MEMS) imaging device affixed to said quarter-wave plate having an array of selectively addressable mirrors thereon, said selectively addressable mirrors having an on state and an off state;
   said PBS further comprising a PBS hypotenuse extending from where said dump exit face meets said output face to a location on said inert face, said PBS hypotenuse arranged and constructed such that a light beam having a first polarization state entering said entrance face reflects off of said PBS hypotenuse towards said imager face while light beams reflecting from selectively addressable mirrors of said MEMS device in the on state having a second polarization state towards said PBS hypotenuse are transmitted through said PBS hypotenuse to said output face;
   said PBS hypotenuse also being arranged and constructed such that light reflecting from selectively addressable mirrors of said MEMS device in the off state and having a mixture of both said first polarization state and said second polarization state are reflected off the PBS hypotenuse towards said dump exit face.

2. The optical imaging engine of claim 1 further comprising a light trap affixed to PBS prism at dump exit face, said light trap comprised of first absorptive waveguide wall and a second absorptive waveguide wall, said first absorptive waveguide wall and said second absorptive waveguide wall are arranged such they form a taper angle where they meet.

3. The optical imaging engine of claim 2 wherein said taper angle is selected such that said first absorptive waveguide wall and said second absorptive waveguide wall exceptionally absorb rays from the widest range of angles incident thereon.

* * * * *